F. W. HINES.
LIGHTING ARRANGEMENT FOR AUTOMOBILES.
APPLICATION FILED OCT. 27, 1921.

1,401,602.
Patented Dec. 27, 1921.

Inventor
Frank W. Hines.

By James H. [Cyle?]
Attorney

UNITED STATES PATENT OFFICE.

FRANK W. HINES, OF WASHINGTON, DISTRICT OF COLUMBIA.

LIGHTING ARRANGEMENT FOR AUTOMOBILES.

1,401,602.    Specification of Letters Patent.    Patented Dec. 27, 1921.

Application filed October 27, 1921. Serial No. 510,756.

*To all whom it may concern:*

Be it known that I, FRANK W. HINES, a citizen of the United States, residing at Washington, in the District of Columbia, have invented certain new and useful Improvements in Lighting Arrangements for Automobiles, of which the following is a specification.

This invention relates to vehicle headlights, and has particular reference to auxiliary lights associated with the regular headlights of the vehicle.

An object of the invention is to provide a plurality of lights to be used in conjunction with the headlight of a motor vehicle, whereby suitable rays of light may be projected onto the roadway in such position that the driver of the car may safely pass another machine without the use of the blinding bright lights.

A further object of the invention is to provide a combination headlight, having a plurality of auxiliary lights associated therewith, the auxiliary lights to burn only when the headlights are turned off, one of said auxiliary lights throwing a ray of light across the front of the machine so that the driver of an advancing car may observe the type and width of the machine to be passed; a second ray of light projected downwardly and across the road to the left of the machine, so that the advancing driver may see just how much road he has to pass on, and a third ray of light projected in advance of the machine and downwardly to the edge of the roadway, so that the driver may himself keep upon the road.

A further object of the invention is to provide such an arrangement of lights which are extremely simple in construction, strong, durable and highly convenient in use.

Other important objects and advantages of the invention will be apparent during the course of the following description.

Figure 1:
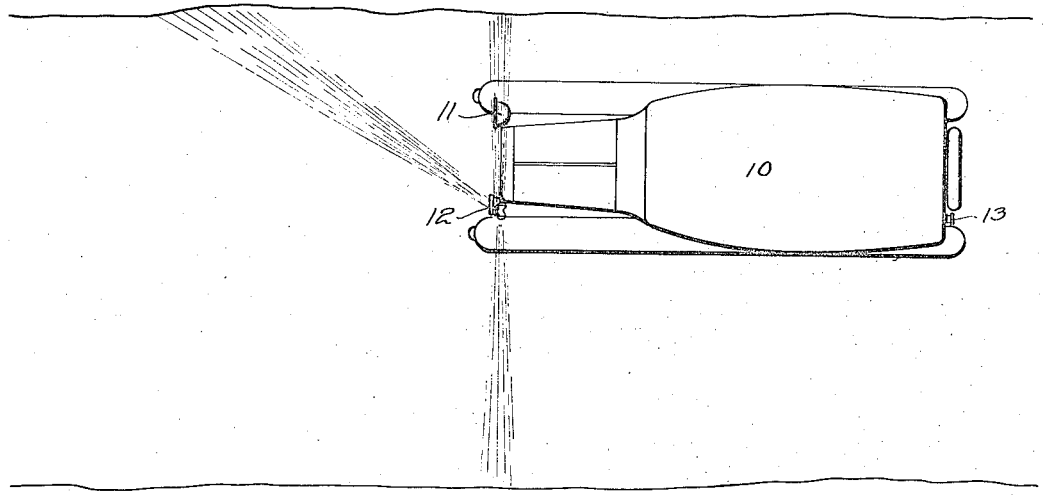
Figures 2, 3:
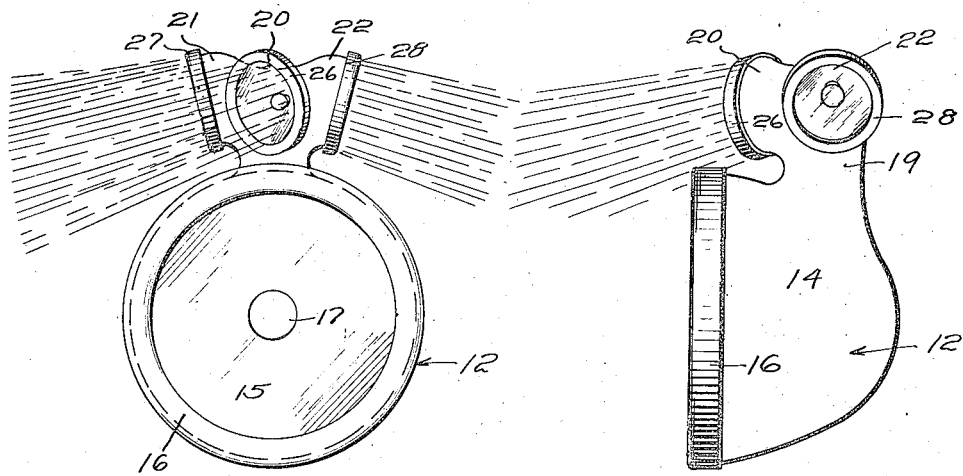
Figures 4, 5:
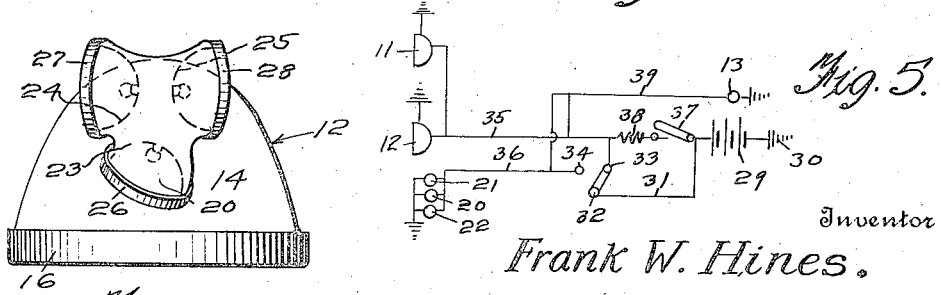

In the accompanying drawings forming a part of this application and in which like numerals are employed to designate like parts throughout, Figure 1 is a diagrammatic plan view of an automobile, illustrating the invention applied thereto, Fig. 2 is a front elevation of a headlight and its associated auxiliary lights, Fig. 3 is a side elevation of the headlight illustrated in Fig. 2, Fig. 4 is a plan view of the headlight illustrated in Fig. 2, Fig. 5 is a diagrammatic view of the electric wiring system.

Referring to the drawings in detail, the numeral 10 designates a motor vehicle of any design. The vehicle carries a right headlight 11 and a left headlight 12. 13 indicates the usual rear or tail light. This invention has to deal with the left headlight in particular.

The numeral 14 designates the casing of the headlight 12, having a lens 15 and a lens retaining ring 16, of usual construction. The casing carries the usual reflector and bright and dim light bulb 17. The headlight so far described is identical in construction with the headlight 11. Preferably formed integral with the casing 14, is a neck extension 19, terminating in heads 20, 21 and 22 respectively. These heads are shaped to form lamp casings and are adapted to receive reflectors 23, 24 and 25, and lens retaining rings 26, 27 and 28. Suitable incandescent electric bulbs are carried by each reflector. The heads 21 and 22 are arranged at a right angle to the main headlight, while the head 20 is arranged at approximately 30° off of the line of light rays from the main headlight. The heads 21, 22 and 23 are so arranged as to project their rays of light downwardly at an angle of approximately 15°. It is to be understood that the angle of the rays of light may be varied at the time of manufacture, to suit the particular type of car upon which it is to be installed.

Current is supplied to the several lights as clearly illustrated in Fig. 5. The numeral 29 indicates the source of current, such as a storage battery. This battery is grounded at 30 to the machine. The opposite side of the battery has a lead wire 31, which has connection with a two way switch 32, adapted to engage contact points 33 and 34. Contact 33 has connection with a wire 35, leading to the headlights 11 and 12. Contact 34 has connection with a wire 36 leading to the lights 20, 21 and 22. Each of the lights are grounded, as a one wire ground system was deemed the most simple, to illustrate the invention. A switch 37 is interposed between the battery 29 and the wire 35 and carries in its length a dimmer coil 38. A wire 39 has connection with wires 35 and 36, such wire leading to the tail light 13. It will be apparent that only one of the switches will be used at a time. When the dimmer switch 37 is on, the switch 32 is in neutral position and vice versa.

When the machine is in use in the city, it is desired that only the dim lights be burning. When driving in the country or in dark places, the dimmer switch may be turned off and the switch 32 thrown over to contact 33. This will give full current to the headlights. When a machine is approaching, the switch 32 is thrown over to the contact 34, thereby cutting out the headlights and turning on the auxiliary lights. In country running, the switch 32 is used exclusively.

The object in placing the auxiliary lights in their respective positions is as follows. The light 21 directs a beam of light across the front of the machine, thereby illuminating it, and also lighting the roadway to the right of the machine. This will enable the driver of the advancing car to see the car to be passed and will thereby be enabled to gage the distance necessary to pass such car. The light 22 directs a beam of light downwardly and across the road to the left of the car, thereby enabling the advancing driver to see just how much road he has to pass on. The light 20 directs a beam of light forwardly of the car and at an angle so that its rays fall to the edge of the road a short distance in front of the car, thereby enabling the driver to himself keep upon the road.

It will be obvious that applicant has provided a lighting arrangement for motor vehicles, which will avoid the many dangers incident to the use of the bright lights of the present systems and the so called dimmer systems. The invention has been demonstrated and has proven highly satisfactory in every respect. With the use of such a combination of lights, it will not be necessary to use the non-glare headlight lenses, and will eliminate the use of the spot lights which heretofore have proven so dangerous to motorists.

It is to be understood that the form of the invention herewith shown and described is to be taken as the preferred example thereof, but is also to be understood that various changes in the shape, size and arrangement of parts may be resorted to without departing from the spirit of the invention or the scope of the subjoined claims.

Having described my invention, what I claim is:—

1. In combination, a main headlight and auxiliary lights associated therewith, the latter being disposed at such angles as to direct light rays toward the right hand edge of the road at a point in advance of the vehicle to which they are applied, and to direct light rays substantially transversely across the roadway to the left of the vehicle and to direct light rays substantially across the front of the said vehicle from left to right to illuminate the front of such vehicle sufficiently to disclose its size and position to the driver of an approaching vehicle.

2. The combination with an automobile, of a plurality of lights mounted thereon one of which directs rays toward the right hand edge of the roadway at a point in advance of the automobile, another of which directs rays transversely across the front of the automobile from left to right and another of which directs rays substantially transversely across the roadway from right to left.

3. In combination a main left hand automobile headlight and a plurality of auxiliary lights mounted thereon one of which directs rays transversely of the line of travel and to the left and another of which directs rays obliquely toward the right and downwardly and another which directs rays transversely and to the right across the front of the automobile to which it is applied.

4. The combination with an automobile and auxiliary lights associated therewith the latter being disposed at such angles as to direct light rays toward the right hand edge of the roadway at a point in advance of the vehicle to which they are applied, and to direct light rays substantially transversely across the roadway to the left of the vehicle and lighting means carried by the said vehicle for illuminating the front of said vehicle to thereby disclose its proportions to the driver of an approaching vehicle.

In testimony whereof I affix my signature.

FRANK W. HINES.